US009387826B2

(12) United States Patent
Lieven et al.

(10) Patent No.: US 9,387,826 B2
(45) Date of Patent: Jul. 12, 2016

(54) WINDSCREEN-WIPER BLADE HAVING MODIFIABLE VERTICAL FLEXIBILITY

(75) Inventors: Patrick Lieven, Fronton (FR); Pascal Chaumel, Plaisance du Touch (FR)

(73) Assignee: Airbus Operations S.A.S. (FR)

( * ) Notice: Subject to any disclaimer, the term of this patent is extended or adjusted under 35 U.S.C. 154(b) by 397 days.

(21) Appl. No.: 13/517,312

(22) PCT Filed: Dec. 14, 2010

(86) PCT No.: PCT/FR2010/052725
§ 371 (c)(1),
(2), (4) Date: Sep. 4, 2012

(87) PCT Pub. No.: WO2011/077028
PCT Pub. Date: Jun. 30, 2011

(65) Prior Publication Data
US 2013/0042428 A1    Feb. 21, 2013

(30) Foreign Application Priority Data

Dec. 21, 2009  (FR) ...................... 09 59281

(51) Int. Cl.
*B60S 1/38*    (2006.01)
(52) U.S. Cl.
CPC ............. *B60S 1/3801* (2013.01); *B60S 1/3874* (2013.01); *B60S 1/3875* (2013.01); *B60S 2001/382* (2013.01); *B60S 2001/3817* (2013.01)
(58) Field of Classification Search
CPC .......... B60S 1/3801; B60S 2001/3817; B60S 1/3877; B60S 1/3874; B60S 1/3875; B60S 2001/382

USPC ............ 15/250.31, 250.352, 250.48, 250.46, 15/250.361, 250.34
See application file for complete search history.

(56) References Cited

U.S. PATENT DOCUMENTS

| 3,089,175 | A  | * | 5/1963 | Hinder .................... | 15/250.43 |
| 8,505,153 | B2 | * | 8/2013 | Nelson .................... | 15/250.41 |
| 8,677,551 | B2 | * | 3/2014 | Guastella et al. ......... | 15/250.39 |
| 2006/0059649 | A1 | * | 3/2006 | Meredith et al. .......... | 15/250.41 |
| 2006/0162114 | A1 | * | 7/2006 | Hoshino .................. | 15/250.47 |

(Continued)

FOREIGN PATENT DOCUMENTS

| DE | 102007050171 A1 | 1/2009 |
| DE | 102008016043 A1 | 10/2009 |

(Continued)

OTHER PUBLICATIONS

International Search Report for Application No. PCT/FR2010/052725 dated Mar. 29, 2011.

*Primary Examiner* — Michael Jennings
(74) *Attorney, Agent, or Firm* — Lerner, David, Littenberg, Krumholz & Mentlik, LLP

(57) ABSTRACT

Wiper blade for a surface of double curvature type, the said wiper blade including a flexible longitudinal wiper and means for exerting a bearing force at at least one point of the said wiper along a direction Z mainly normal to the surface, also including a longitudinal 15 part, attached to the wiper at several points, and means to vary over time and in at least one segment of the longitudinal rod the rigidity in bending of this longitudinal rod in a plane XZ normal to the surface between previously chosen values. The longitudinal part is a metallic blade where the inertias on the two axes of its section are very different.

9 Claims, 2 Drawing Sheets

(56) References Cited

U.S. PATENT DOCUMENTS

Figure 1A:
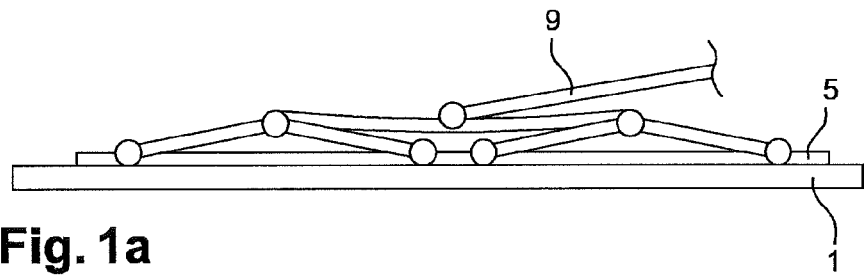

2010/0125967 A1* 5/2010 Lieven .................... 15/250.202
2011/0197381 A1* 8/2011 Nelson ........................... 15/103

FOREIGN PATENT DOCUMENTS

FR           2879541 A1      6/2006
GB           2423009 A       8/2006

* cited by examiner

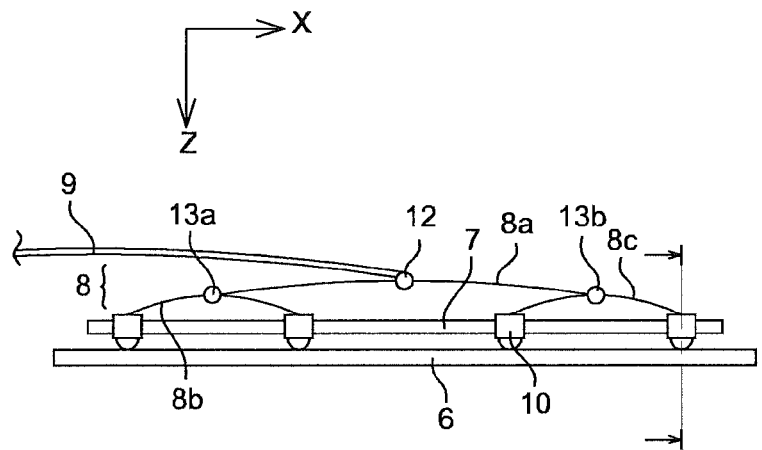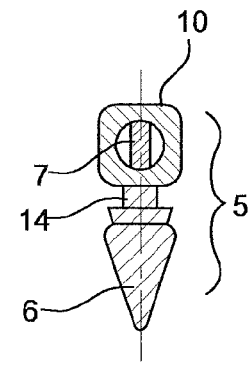
Fig. 4a  Fig. 4b
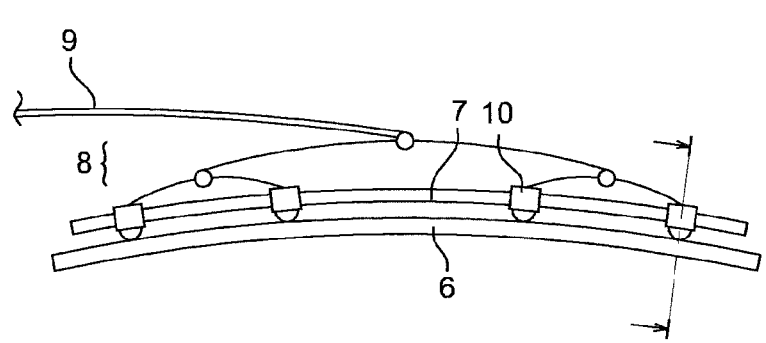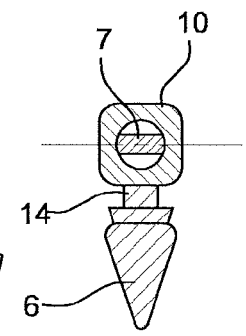
Fig. 5a  Fig. 5b
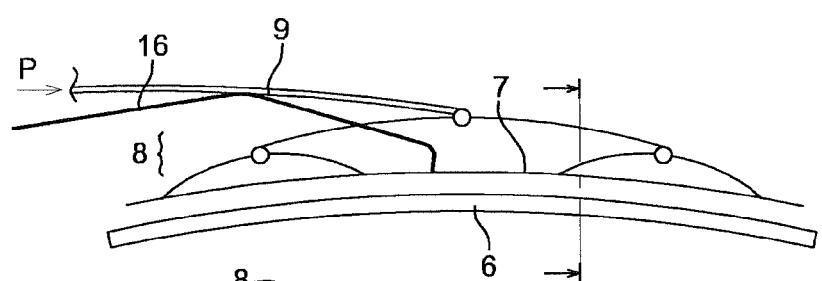
Fig. 6a
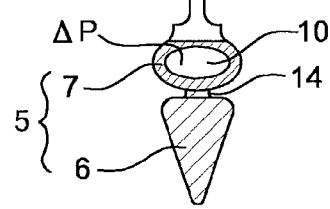
Fig. 6b

WINDSCREEN-WIPER BLADE HAVING MODIFIABLE VERTICAL FLEXIBILITY

CROSS-REFERENCE TO RELATED APPLICATIONS

The present application is a national phase entry under 35 U.S.C. §371 of International Application No. PCT/FR2010/052725, filed Dec. 14, 2010, published in French, which claims priority from French Patent Application No. 0959281 filed Dec. 21, 2009, the entire disclosures of which are hereby incorporated herein by reference.

The present invention relates to the domain of windshield wipers and more especially concerns the windshield wipers for aircraft.

In the aeronautics domain, to allow the pilot to observe the outside environment of the aircraft, the cockpit is equipped with various windows and, especially, one or more front windows forming the windshield. These front windows, generally two in commercial aircraft, have had conventionally up until now a flat form and their aerodynamic continuity with the fuselage at their contours is ensured by a seal.

In rainy weather, the water flowing on the front window or windows and insect impacts can hinder the pilot's visibility especially during take-offs and landings. Windshield wipers are thus installed on the outer faces of these front windows. Their operation by cyclic sweep through the arc of a disk over the window by a wiper blade globally perpendicular to this arc and bearing a wiper is known and similar, for example, to that of automotive vehicles.

The windshield wiper travels therefore, during the said cyclic sweep, over an area called the wiping area. For the wiping to be optimal, the contact between the wiper and the windshield must be maintained and be uniform over the complete length of the wiper blade and this throughout the wiping.

During non-utilization phases, for visibility reasons, the windshield wipers are stored in a rest position generally located on the edge of the wiping area (vertical or horizontal) called the storage position.

Elements with low stiffness, such as the seal, can be located in the area swept by the windshield wiper during its normal wiping (wiping area overlapping the seal to wipe a maximum area of the window), or during its transition from the wiping area to this storage position or its reverse transition and can therefore be damaged by the recurrent passing of the wiper. The consequences are both the deterioration of the seal and therefore a reduction in its efficiency and increased aerodynamic drag of the aircraft also leading to increased fuel consumption.

For reasons concerning the enlargement of the pilots' field of view and the aerodynamics, the design of aircraft windshields is evolving towards a double-curvature shape instead of the previous flat shape.

This double curvature shape is characterized

1/ by a transverse curvature of the windshield, first fairly high near to the lateral part of the fuselage, then lower at the central part of the fuselage seen front on, 2/ by a low-radius longitudinal curvature over the complete height of the windshield mating with the general shape of the fuselage.

Windshield wipers including rigid wipers, adapted to flat surfaces, are not suitable for these curved shapes as the contact between the windshield and the wiper is not ensured over the complete surface of the wiper blade during the complete wiping operation.

An articulated windshield wiper of conventional pantograph type (FIGS. 1a and 1b), such as used on automotive vehicles, is more suitable as its wiper accepts a variation in the curvature of the windshield during wiping.

However, this type of windshield wiper does not solve the problem of possible damage to the seal or seals during the wiping or during the transitions from or to the windshield wiper storage position.

Moreover, if the transition includes a raising of the arm (FIG. 1c) before its storage, the operation of the articulated windshield wiper of conventional pantograph type maintains, during its raising, contact between the two ends of the wiper and the windshield liable to cause local deterioration of the windshield or deterioration of the wiper itself.

The target of this invention is to propose a windshield wiper device which maintains a uniform contact between the wiper and the windshield which it must wipe throughout the movement related to the wiping and which simultaneously allows the problem of damage to sensitive items such as seals between the windshield and the fuselage to be solved during the possible movement from the wiping area to the storage position or its reverse movement.

A second target of the invention is to minimize the wear of the windshield wiper in its storage position.

A third target is to allow simultaneous raising of the complete wiper.

For this purpose, the invention proposes a wiper blade for a surface of double curvature type, the said wiper blade including a flexible longitudinal wiper and means for exerting a bearing force at at least one point of the said wiper along a direction Z principally normal to the surface, wherein it also includes a longitudinal part, attached to the wiper at several points, and means to make vary over time and at at least one segment of the longitudinal part, the rigidity in bending of the said longitudinal part in a plane XZ normal to the surface, between previously chosen values.

It can be understood that the capability of varying the vertical flexibility (rigidity in bending in the vertical plane) of the longitudinal rod attached to the wiper allows the contact force received from an outer arm to be transmitted in a chosen manner either to a single point of the wiper, or to a set of points. In the second case, the wiper is in contact at each of these points with the surface on which it is placed and takes therefore more or less the form of this surface. In the first case, on the contrary, the wiper takes the form of the longitudinal rod.

This arrangement moreover avoids unwanted contacts at the ends of the wipers attached to the wiper blades of conventional pantograph type when the wiper is raised.

According to a specific embodiment, the longitudinal part has at least two very different rigidity in bending values along axes perpendicular to its longitudinal axis X.

It can be understood that this arrangement corresponds to the use of a longitudinal part the section of which includes at least two very different dimensions to ensure these very different rigidities in bending.

More especially, the longitudinal part is a blade of rectangular section the thickness of which is such that the rigidity in bending of the blade perpendicularly to this thickness is clearly lower than that of the wiper, and the width of which is such that the rigidity in bending of the blade perpendicularly to this width is clearly higher than that of the wiper.

It can be understood that the rigidity in bending must be either sufficiently low to follow the deformations of the wiper, or sufficiently high to constrain the wiper to take up a storage position in the vicinity of the longitudinal rod.

Still more particularly, the means to make the rigidity in bending of the longitudinal part vary over time are means to make the blade pivot between a position where its main plane is parallel to the horizontal plane XY, and a position where its main plane is perpendicular to the horizontal plane XY.

This arrangement allows a simple implementation.

According to another embodiment, the longitudinal part is a long cylinder of low section, hollow, adapted to be pressurized, and such that the rigidity in bending of the cylinder perpendicularly to its section is clearly lower than that of the wiper when it is not pressurized, and that the rigidity in bending of the cylinder perpendicularly to its section is clearly higher than that of the wiper when the cylinder is pressurized.

In this case, according to an advantageous embodiment, the means to make the rigidity in bending of the longitudinal part vary over time are cylinder pressurization means.

Again, in this case and for manufacturing simplification reasons, the cylinder and the wiper are advantageously made in one part.

This embodiment allows a low cost implementation of the device especially when the wiper and the cylinder are made in one part.

According to an advantageous embodiment, the wiper blade includes a pantograph attached to the longitudinal part at several points.

In the same way, this corresponds to a simple industrial implementation of the device. The windshield wiper blade is then installable as a replacement for a traditional wiper blade without modification of the suspension arm or of the windshield wiper drive means by simply taking into account the electrical or pneumatic connection of the rigidity in bending control means of the longitudinal part.

Under a second aspect, the invention targets a windshield wiper including a drive and suspension arm, wherein it includes a wiper blade as described attached to an end of the said suspension arm.

Advantageously, the windshield wiper including a drive and suspension arm includes a wiper blade equipped with means for controlling the rigidity in bending of the longitudinal rod in the vertical plane XZ, the said wiper blade being attached to one end of the said suspension arm and also includes control electronics of the rigidity in bending control means of the longitudinal part in the vertical plane XZ including a processor and a memory in which a control logic is stored, these electronics also controlling a windshield wiper drive motor.

These control electronics can be dedicated to the control of windshield wipers or, on the contrary, be common to many aircraft means. In this case, specific software installed in an existing computer can manage the control of the flexibility control means of the wiper support rod.

The invention also targets a process for controlling a windshield wiper such that in a wiping phase, the longitudinal part is controlled in such a way that its rigidity in bending in the vertical plane XZ will be low, and in a transition phase, the longitudinal part is controlled in such a way that its rigidity in bending in the vertical plane XZ will be high, then the suspension and drive arm is moved to above the storage position.

Under yet another aspect, the invention targets a computer program product including a set of instructions capable of implementing a process such as described when the said set of instructions is executed on a computer.

This arrangement targets the case where the windshield wiper control is ensured by a preexisting computer executing prestored software to control the windshield wipers.

Figure 1B:
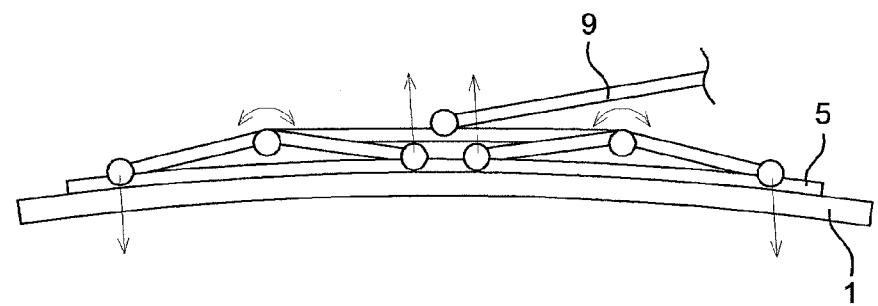
Figure 1C:
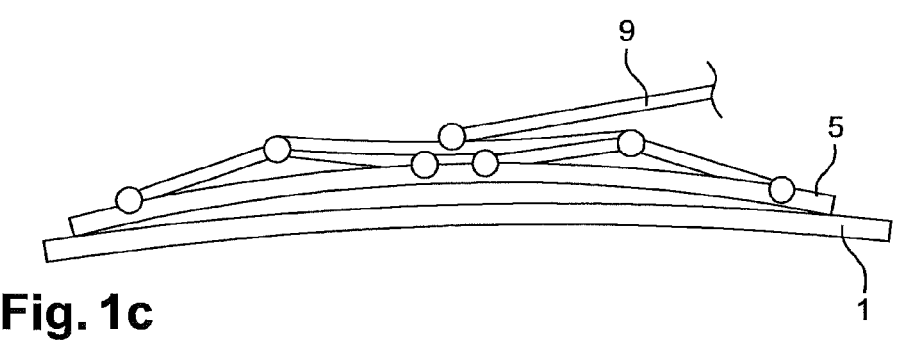
Figure 2:
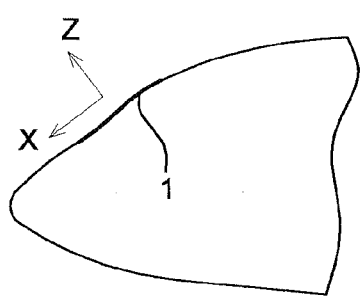
Figure 3:
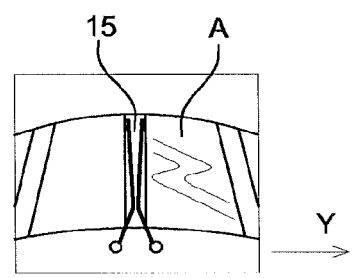

The features and advantages of the invention will become apparent on reading the description and drawings of a particular embodiment given as an example without limitations and for which the drawings represent:

FIGS. 1*a* and 1*b* illustrate a windshield wiper blade of conventional pantograph type, on a flat window and on a window with a curvature, FIG. 1*c* represents the same wiper blade being raised, FIG. 2 is a profile view of the front part of an aircraft fuselage, FIG. 3 is a front view of the front part of an aircraft fuselage, FIG. 4*a* is a schematic side view of a windshield wiper according to the invention in straight position, and FIG. 4*b* shows a straight section of this windshield wiper blade at a control means, FIG. 5*a* is a schematic side view of a windshield wiper according to the invention, in wiping position, and FIG. 5*b* shows a straight section of this windshield wiper blade at a control means, FIG. 6*a* is a schematic detailed view of a windshield wiper blade in a variant of the invention, and FIG. 6*b* shows a straight section of this wiper blade.

The invention finds its place in the front part of an aircraft fuselage at the cockpit windshield.

As can be seen on FIG. 3, the windshield includes, in the present example and in no way exhaustive, two front windows 1, attached to the fuselage 2 by a flange and a seal 3. In the example shown on FIG. 2, the two front windows 1 are separated by a vertical upright 15.

A windshield wiper 4, shown on FIG. 3, is installed opposite each of the front windows 1 the function of which is to wipe the surface of the said window 1 by a cyclic sweep, driven and controlled by a motor of a type known by a person skilled in the art. The two windshield wipers 4 are arranged in a symmetrical manner for the two front windows forming the windshield and are stored, as can be seen on FIG. 3, in a rest position, in the present example a vertical position located in the immediate vicinity of the vertical upright 15.

For the remainder of the description, a longitudinal axis X, tangent locally to the windshield and oriented in the longitudinal direction of the windshield wiper 4, and a transverse axis Y, tangent locally to the windshield and perpendicular to the windshield wiper 4 are defined. Likewise, an inside-outside axis Z is defined aligned with the local normal axis of the windshield 1 of the aircraft. The terms up and down will be used in reference to the inside-outside axis Z.

A windshield wiper 4 according to the invention, represented schematically on FIG. 4, includes a wiper blade 5 attached to one end of a drive and suspension arm 9 by its center 12.

The suspension arm 9 is attached by its other end to a drive axis intended to confer to the arm 9 and to the wiper blade 5 an alternative rotational movement parallel to the main plane of the wiping area A of the window 1 that the said wiper blade 5 must wipe.

The wiper blade 5 includes a pantograph 8 and a support rod 7 attached to a wiper 6. The pantograph 8, the support rod 7 and the wiper 6 are arranged in a same plane XZ perpendicular to the main plane XY of the wiping area A.

The pantograph 8 takes a force along the vertical bearing axis Z towards the surface 1, generated by the suspension arm 9 and distributes it at four points (in the example illustrated on FIGS. 4 to 6) of the support rod 7 of the wiper 5 without generating stresses on the respective vertical positions of these points so as to absorb the variations in the curvature of the surface.

To achieve this and in a manner known itself, it includes, in the present example, an upper leg 8*a*, hinged to rotate freely about the transverse axis Y, by its center 12 at the suspension arm 9. Also, the pantograph 8 includes, hinged to rotate freely about the transverse axis Y around ends 13a, 13b of the upper leg 8a, two sub-legs 8b, 8c suspended by their respective centers. Each of these legs and sub-legs 8a, 8b, 8c has an arced form and is made from a semi-rigid material, for example in the form of two-position rods of rectangular section.

The wiper 6 of the wiper blade 5 is similar to the wiper of car or aircraft windshield wipers of known types. The said wiper 6 is for example made of rubber or elastomer or any other material for this type of application.

It can be understood that wiper 6 is chosen in a manner to be sufficiently flexible (low rigidity) to mate with a line of the double-curvature surface if a bearing force is applied to it at a sufficient number of points to guarantee a contact over its complete length.

It is of triangular section (see sections FIGS. 4b, 5b), a tip of the triangle being oriented towards the windshield 1 along the inside-outside axis Z.

The suspension arm 9, the pantograph 8 and the wiper 6 are known themselves by a person skilled in the art and are outside the scope of the present invention. They are therefore not described in more detail here.

The wiper 6 is attached to the pantograph 8 by means of four support parts 10, each attached to an end of a sub-leg 8b, 8c, of the pantograph 8 (FIGS. 4 and 5).

The junction between the wiper 6 and each support part 10 is an area 14 of lower resistance to transverse bending to allow the wiper 6 to tilt slightly about its longitudinal axis X in its wiping movement of the window 1.

In the implementation of the invention described here, the four supports 10 are attached to each other by a two-position rod 7 extending mainly along the longitudinal axis X in a manner parallel to the wiper 6 and practically over the same length.

The two-position rod 7 is here a metallic blade of rectangular section with two clearly different main dimensions, for example a thickness of 1 mm for a width of 6 mm. These dimensions, given here as an example without limitations, and its manufacturing material, are chosen to confer a high rigidity in bending to this two-position rod 7 perpendicularly to a its thickness and a high rigidity in bending perpendicularly to its width. The inertias on the two axes Y and Z of its section are in effect very different.

Each of the support parts 10 includes a cutout of circular section, oriented along longitudinal axis X and adapted to allow for the passage of the two-position rod 7.

The two-position rod 7 is made mobile between two positions (FIGS. 4b, 5b), where it is oriented in such a way that its plane of lower thickness is either parallel to the horizontal plane XY (down position), or parallel to the plane YZ (up position), and therefore perpendicular to the horizontal plane XY.

In the first position (down), the two-position rod 7 has a low bending strength in the vertical plane XZ. It will therefore deform in a similar manner to the deformation of the wiper 6, which is generated by the flexibility of the said wiper 6 and the curvature of the window 1 to be wiped.

In the second position (up), the two-position rod 7 has a high bending strength in the vertical plane XZ. Therefore, it adopts a form substantially straight oriented along the longitudinal axis X, and then confers to the wiper 6, by means of support parts 10, a position also straight. The two-position rod 7 and the wiper 6 are then globally parallel.

The two-position rod 7 is driven from one of its positions to the other by electromagnetic control means (for example by locally placing polarized magnets on the faces of the two-position rod 7 and control electromagnets in the support parts 10). As a variant, these control means can be mechanical (using for example a miniature electric motor with axis parallel to the longitudinal axis and driving the two-position rod in rotation by means of a gear).

Such means to move the two-position rod 7 from one position to another are known by persons skilled in the art and their type and precise operating mode as such are not within the scope of the invention.

The means controlling the position of the two-position rod 7 are attached to control electronics, not represented here, including for example a processor and a non-volatile memory in which a control logic is stored, these electronics also controlling, to save means, the drive motor of the windshield wiper 4.

In operation, in the windshield wiping phase, the wiper 6 is placed in contact with the window 1 by the force distributed by the pantograph 8. In this phase, the two-position rod 7 is in "down" position, presenting its wide face to the horizontal plane XY of the window 1. Its rigidity in transversal bending is then very high and allows the cyclic sweep movement, imparted by the suspension arm 9, to be transferred to the wiper 6 without it being longitudinally deformed.

When the windshield wiper must be placed in storage position, controlled by the pilot or automatically by a preexisting windshield wiper control logic, the control electronics commands a 90° rotation of the metallic blade 7. This induces an increase in its rigidity in bending in the vertical plane XZ which then becomes much higher than that of the wiper 6. It is therefore brought alongside the metallic blade 7 in a globally straight position.

This position avoids the shortcoming of conventional pantograph windshield wipers where the ends of the wiper 6 rub on the window during the raising of the said wiper.

Once the wiper 6 is in raised position, the arm 9 is moved laterally, by known means, towards a storage position, for example on the vertical upright 15 located between the two front windows 1.

In storage position, the blade can possibly be laid down again to place the wiper in contact with the vertical upright 15.

The scope of the present invention is not limited to the details of the embodiment forms above considered as an example but on the contrary extends to modifications within the scope of a person skilled in the art.

In an advantageous variant, illustrated by FIGS. 6a and 6b, the metallic blade 7 is replaced by a hollow pressurizable cylinder, for example formed in one part with the wiper 6 and the support parts 10. In this variant, the hollow cylinder 7 has a length of several tens of centimeters, similar to that of wiper 6, and a diameter of around one centimeter. It is made of elastomer or of a flexible composite material.

When it is not pressurized, the rigidity in bending of its walls is very low and the rigidity in bending of the cylinder+wiper assembly is close to that of the wiper 6 alone. In this situation, the wiper 6 mates with the form of the surface on which it is in contact.

On the contrary, when the cylinder 7 is pressurized (for example 0.5 bars above ambient pressure), its rigidity in bending (bending strength) increases and quickly becomes much higher than that of the wiper 6. In this situation, the wiper 6 mates with the form of the pressurized cylinder 7, straight and globally parallel to the plane of surface 1.

In this implementation, cylinder 7 is connected by a tube 16 to a pressurization means not shown on the figures, of a type known itself, and arranged inside the fuselage.

Alternatively, the cylinder is previously partially filled with fluid and only an internal ballonet of the cylinder is pressurizable.

In this arrangement, the rigidity in bending of the cylinder is again very low when the ballonet is not pressurized and its rigidity is high when the ballonet is pressurized.

The operation of this device using a pressurized cylinder is similar to that of the prior description, with here again a longitudinal part 7 with at least two very different vertical flexibility values (rigidity in bending) and transition control means between these values.

In another variant, the wiper is attached to a support rod where only the two ends are equipped with segments of variable flexibility (orientable metallic blades or cylinders pressurizable possibly independently).

This variant allows control of the raising of the ends of the wiper without separating the remainder of the wiper from the surface to be wiped. This can be useful in the case where the sector of the disk swept by the windshield wiper blade overlaps onto part of the fuselage to maximize the wiped zone and the pilot's visibility. Local raising of the wiper then avoids rubbing on the seal and therefore reduces its deterioration.

The invention claimed is:

1. A wiper blade for a surface of double curvature type, the wiper blade comprising:
    a flexible longitudinal wiper;
    means to exert a bearing force at least one point of the wiper in a direction Z substantially normal to the surface;
    a longitudinal part, attached to the wiper at a plurality of points, said longitudinal part having at least a first predetermined value of rigidity in bending associated with a first predetermined cross-sectional shape and a second predetermined value of rigidity in bending associated with a second predetermined cross-sectional shape;
    means to vary in at least a segment of the longitudinal part the rigidity in bending of the longitudinal part in a plane XZ normal to the surface between the first and second predetermined values by changing the cross-sectional shape of the longitudinal part relative to the wiper from one of the first and second predetermined cross-sectional shapes to the other of the first and second predetermined cross-sectional shapes and
    control electronics for the means controlling the rigidity in bending of the longitudinal part in the vertical plane XZ, including a processor and a memory in which a control logic is stored.

2. The wiper blade according to claim 1, wherein the longitudinal part has the first value of rigidity in bending along a first axis perpendicular to a longitudinal axis X of the longitudinal part and the second value of rigidity in bending along a second axis perpendicular to the longitudinal axis X.

3. The wiper blade according to claim 2, wherein the longitudinal part is a blade of rectangular section the thickness of which is such that the rigidity in bending of the blade perpendicularly to the thickness is lower than that of the wiper and the width of which is such that the rigidity in bending of the blade perpendicularly to this width is greater than that of the wiper.

4. The wiper blade according to claim 3, wherein the means to make the rigidity in bending of the longitudinal part vary are means for pivoting the blade between a first position in which the main plane of the blade is parallel to the horizontal plane XY and a second position where the main plane of the blade is perpendicular to the horizontal plane XY.

5. The wiper blade according to claim 1, further comprising a pantograph attached to the longitudinal part at a plurality of points).

6. A windshield wiper comprising a drive and suspension arm and a wiper blade for a surface of double curvature and connected to one end of the said suspension arm, wherein the wiper blade comprises: a flexible longitudinal wiper;
    means to exert a bearing force at at least one point of the wiper in a direction Z substantially normal to the surface;
    a longitudinal part, attached to the wiper at a plurality of points, said longitudinal part having a first predetermined value of rigidity in bending in a first plane normal to the longitudinal axis X of the longitudinal part and a second predetermined value of rigidity in bending in a second plane normal to the longitudinal axis X;
    means to vary in at least a segment of the longitudinal part the rigidity in bending of the longitudinal part in a plane XZ normal to the surface between the first and second predetermined values by changing a cross-sectional shape of the longitudinal part relative to the wiper and
    control electronics for the means controlling the rigidity in bending of the longitudinal part in the vertical plane XZ, including a processor and a memory in which a control logic is stored.

7. A method for controlling a windshield wiper according to claim 6, wherein:
    in a wiping phase, the longitudinal part is controlled to assume a first cross-sectional shape relative to the wiper in such a way that the first value of rigidity in bending of the longitudinal part in the vertical plane XZ is low, and
    in a transition phase, the longitudinal part is controlled to assume a second cross-sectional shape relative to the wiper in such a way that the second value of rigidity in bending of the longitudinal part in the vertical plane XZ is high, and
    moving the suspension and drive arm to the storage position.

8. A windshield wiper comprising a drive and suspension arm and a wiper blade for a surface of double curvature, connected to one end of the said suspension arm; and
    a flexible longitudinal wiper;
    means to exert a bearing force at at least one point of the wiper in a direction Z substantially normal to the surface;
    a longitudinal part, attached to the wiper at a plurality of points, said longitudinal part having a first predetermined value of rigidity in bending in a first plane normal to the longitudinal axis X of the longitudinal part and a second predetermined value of rigidity in bending in a second plane normal to the longitudinal axis X;
    wherein the longitudinal part has a rectangular cross-section having a thickness and a width;
    means to vary in at least a segment of the longitudinal part the rigidity in bending of the longitudinal part in a plane XZ normal to the surface between the first and second predetermined values by changing an orientation of the thickness and the width relative to the wiper, and
    control electronics for the means controlling the rigidity in bending of the longitudinal part in the vertical plane XZ, including a processor and a memory in which a control logic is stored, the electronics also controlling a windshield wiper drive motor.

9. The windshield wiper of claim 8, wherein the thickness is such that the first value of rigidity in bending of the blade perpendicularly to the thickness is lower than the rigidity in bending of the wiper and the width is such that the second value of rigidity in bending of the blade perpendicularly to the width is greater than the rigidity in bending of the wiper.

* * * * *